United States Patent
Jacobs

(10) Patent No.: US 6,173,174 B1
(45) Date of Patent: Jan. 9, 2001

(54) METHOD AND APPARATUS FOR AUTOMATED SSD UPDATES ON AN A-KEY ENTRY IN A MOBILE TELEPHONE SYSTEM

(75) Inventor: Pamela J. Jacobs, Omaha, NE (US)

(73) Assignee: Compaq Computer Corporation, Cupertino, CA (US)

( * ) Notice: Under 35 U.S.C. 154(b), the term of this patent shall be extended for 0 days.

(21) Appl. No.: 09/447,516

(22) Filed: Nov. 23, 1999

Related U.S. Application Data

(63) Continuation of application No. 08/781,260, filed on Jan. 11, 1997, now abandoned.

(51) Int. Cl.$^7$ .................................................. H04M 1/66
(52) U.S. Cl. ............................................ 455/411; 380/23
(58) Field of Search .................................. 455/410, 411, 455/423, 424, 425, 406, 408, 422, 432, 433, 435, 517, 461, 33.1, 414; 379/1.2, 142; 380/23, 21, 25, 44, 49, 43, 46, 47, 228, 50; 340/825.31, 825.34

(56) References Cited

U.S. PATENT DOCUMENTS

| | | |
|---|---|---|
| 4,930,150 | 5/1990 | Katz . |
| 5,014,298 | 5/1991 | Katz . |
| 5,048,075 | 9/1991 | Katz . |
| 5,077,790 | 12/1991 | D'Amico et al. . |
| 5,091,942 | 2/1992 | Dent . |
| 5,128,984 | 7/1992 | Katz . |
| 5,204,902 * | 4/1993 | Reeds, III et al. .................... 380/23 |
| 5,237,612 | 8/1993 | Raith . |
| 5,282,250 | 1/1994 | Dent et al. . |
| 5,309,501 | 5/1994 | Kozik et al. . |
| 5,504,804 | 4/1996 | Widmark et al. . |
| 5,513,245 * | 4/1996 | Mizikovsky et al. .................. 379/59 |
| 5,551,073 | 8/1996 | Sammarco . |
| 5,553,120 | 9/1996 | Katz . |
| 5,590,175 | 12/1996 | Gallant et al. . |
| 5,594,740 | 1/1997 | LaDue . |
| 5,603,081 | 2/1997 | Raith et al. . |
| 5,615,267 | 3/1997 | Lin et al. . |
| 5,642,401 | 6/1997 | Yahagi . |
| 5,668,875 | 9/1997 | Brown et al. . |
| 5,708,710 * | 1/1998 | Duda ..................................... 380/21 |
| 5,737,701 | 4/1998 | Rosenthal et al. . |
| 5,754,952 | 5/1998 | Hodges et al. . |
| 5,754,955 | 5/1998 | Ekbatani . |
| 5,761,500 | 6/1998 | Gallant et al. . |
| 5,794,139 | 8/1998 | Mizikovsky et al. . |
| 5,799,084 * | 8/1998 | Gallagher et al. ...................... 380/23 |
| 5,887,251 * | 3/1999 | Fehnel .................................. 455/411 |
| 6,085,083 * | 7/2000 | Lamb ................................... 455/410 |
| 6,097,939 * | 8/2000 | Jacobs .................................. 455/410 |
| 6,111,955 * | 8/2000 | Mizikovsky et al. ................ 380/278 |
| 6,112,079 * | 8/2000 | Lamb ................................... 455/411 |

* cited by examiner

Primary Examiner—Daniel S. Hunter
Assistant Examiner—Pablo Tran
(74) Attorney, Agent, or Firm—Fenwick & West LLP

(57) ABSTRACT

A method and apparatus for allowing an Authentication Center (AC) to configure whether or not to perform automated A-key updating for a handset if an authentication failure occurs during an operation attempted by the handset. The AC has access to a Subscriber database describing, among other things, an "alternate A-key" for at least some of the subscribers. The AC also has access to database that contains configuration information about various MSCs in the system.

16 Claims, 24 Drawing Sheets

| 702 | Authentication Request INVOKE Message | | |
|---|---|---|---|
| | Parameter | R/C | Description & Usage |
| 704 | Mobile Identification Number (MIN) | R | Contains the MIN of the subscriber. Used as a key to the AC Subscriber Profile file (SUBA). |
| | Equipment Serial Number (ESN) | R | Contains the Equipment Serial Number of the subscriber. Used for validation by comparison with ESN in the SUBA file. |
| | System Capabilities (SYSCAP Serving) | R | Defines the authentication capabilities of the serving system. |
| | System Access Type (SYSACCTYPE) | R | Identifies the type of system access made by the MS. |
| | MSCID (Serving MSC or VLR) | R | Contains the MSCID of the serving MSC/VLR. |
| 706 | Authentication Data | C | Contains the 24-bit authentication data used as input to CAVE for call origination. This parameter is derived from the information sent by the MS to the MSC/VLR. |
| | Authentication Response (AUTHR) | C | Contains the response generated by an MS when accessing the system for call origination, page response, or autonomous registration. It is computed by CAVE using the SSD of the MS and a Random Number (RAND) chosen by the MS. |
| | Call History Count (COUNT) | C | Contains a modulo-64 event counter maintained by the MS, the AC, and, optionally, the VLR. It is used for clone detection. The events that result in the counter being incremented are defined by the AC and, optionally, the VLR. They may include initial registration in a new serving MSC, call origination, page response, or expiration of a timer. |
| 708 | Confidentiality Modes (Actual) | C | Not used by this release of AC. |
| | Digits (Dialed) | C | Contains dialed digits for input to the CAVE algorithm if SYSACCTYPE is Call Origination. |
| | PC_SSN (Serving MSC or VLR) | C | Contains the Point Code and SSN of the serving MSC/VLR. |
| | Random Variable (RAND) | C | Contains a random number that is used as input to the CAVE algorithm for authentication. The random number is chosen by the serving system (MSC or VLR) independently of the AC. |
| | Sender Identification Number | C | Not used by this release of AC. |
| | Terminal Type | C | Identifies the radio frequency interface standard supported by the associated MS. |

FIG. 7(a)

| SYSACCTYPE | PARAMETERS |
|---|---|
| Unspecified or Reserved | MIN, ESN, SYSCAP, SYSACCTYPE, MSCID |
| Flash Request | MIN, ESN, SYSCAP, SYSACCTYPE, MSCID |
| Registration | MIN, ESN, SYSCAP, SYSACCTYPE, MSCID, RAND, and AUTHR |
| Call Origination | MIN, ESN, SYSCAP, SYSACCTYPE, MSCID, RAND, AUTHR, and (Dialed Digits or Authentication Data) |
| Page Response | MIN, ESN, SYSCAP, SYSACCTYPE, MSCID, RAND, and AUTHR |
| Not Used or No Access | MIN, ESN, SYSCAP, SYSACCTYPE, MSCID |

FIG. 7(b)

| Authentication Request RETURN RESULT Message |||
|---|---|---|
| Parameter | R/C | Description & Usage |
| Authentication Algorithm Version | C | Not used by the current release of AC. |
| Authentication Response Unique challenge (AUTHU) | C | Contains the response to a Unique Challenge Order. It is computed by CAVE using the SSD of the MS and a Random Number (RANDU). |
| Call History Count (COUNT) | C | Not used by this release of AC. |
| CDMA Private Long Code Mask | C | Not used by the current release of AC. |
| Deny Access (DENACC) | C | Indicates a Deny Access response and the reason the MS has failed authentication. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Shared Secret Data (SSD) | C | Contains the SSD used in authentication of a MS. The SSD is computed only at the AC and at the MS since it is based on the A-Key which is shared only between the AC and the MS. |
| Signaling Message Encryption Key | C | Not used by this release of AC. |
| Terminal Type (TERMTYP) | C | Identifies the radio frequency interface standard supported by the MS. The values of this parameter are derived from the IS-54 Mobile Protocol Capability Indicator (MPCI). |
| SSD Not Shared (NOSSD) | C | Indicates the previously provided SSD is no longer valid. |
| Update Count (UPDCOUNT) | C | Indicates the Call History Count in the MS, and optionally the MSC/VLR, should be incremented. |
| Voice Privacy Mask | C | Not used by this release of AC. |

FIG. 8(a)

| Authentication Event | MSC/VLR shares SSD | MSC/VLR does not share SSD |
|---|---|---|
| SSD Update | RANDSSD, and SSD | AUTHU, RANDSSD, RANDU, and NOSSD |
| Unique Challenge | RANDU, AUTHU, and SSD | RANDU, AUTHU, and NOSSD |

FIG. 8(b)

| Parameter | R/C | Description & Usage |
|---|---|---|
| Mobile Identification Number (MIN) | R | Contains the MIN of the subscriber. Used as a key to the AC Subscriber Profile file (SUBA). |
| Equipment Serial Number (ESN) | R | Contains Equipment Serial Number of the subscriber. Used for validation by comparison with ESN in the SUBA file. |
| Authentication Algorithm Version | C | Not used by the current release of AC. |
| Authentication Response Unique Challenge (AUTHU) | C | Contains the 18-bit response to a Unique Challenge Order. It is computed from the CAVE algorithm using the SSD of the MS and RANDU. |
| Call History Count (COUNT) | C | Not used by the current release of AC. |
| Deny Access (DENACC) | C | Not used by the current release of AC. |
| Location Area ID | C | Not used by is release of AC. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Sender Identification Number | C | Not used by the current AC release. |
| Shared Secret Data (SSD) | C | The SSD is not included in the invoke since the Authentication Directive is routed to the HLR and the HLR is responsible for routing the Authentication Directive based on the most recent MS location data. Because the AC does not have the location data stored in the HLR, it cannot determine if SSD is shared. Therefore, to avoid sending SSD to a MSC/VLR that is not supposed to share SSD, SSD is not included in the Authentication Directive |
| SSD Not Shared (NOSSD) | C | Indicates the previously provided SSD is no longer valid. |
| Update Count (UPDCOUNT) | C | Not used by the current release of AC. |

FIG. 9(a)

| Authentication Event | Invoke Message Contents |
|---|---|
| Immediate Manual SSD Update | MIN, ESN, RANDSSD, RANDU, AUTHU, and NOSSD |
| Manual Unique Challenge | MIN, ESN, RANDU, and AUTHU |
| Subscriber MS ESN Change | MIN, ESN, and NOSSD |
| Subscriber Authentication Deactivation | MIN, ESN, and NOSSD |

FIG. 9(b)

| Authentication Directive RETURN RESULT Message |||
|---|---|---|
| Parameter | R/C | Description & Usage |
| Call History Count (COUNT) | C | Contains a modulo-64 event counter maintained by the MS, the AC, and, optionally, the VLR. It is used for clone detection. The events that result in the counter being incremented are defined by the AC and, optionally, the VLR. They may include initial registration in a new serving MSC, call origination, page response, or expiration of a timer. |

FIG. 10

METHOD AND APPARATUS FOR AUTOMATED SSD UPDATES ON AN A-KEY ENTRY IN A MOBILE TELEPHONE SYSTEM

RELATED APPLICATIONS SECTION

This application is a continuation of U.S. application Ser. No. 08/781,260, filed Jan. 11, 1997, now abandoned.

The following applications are related to the subject application. Each of the following applications is incorporated by reference herein.

1. U.S. application Ser. No. 08/781,262 entitled "Method and Apparatus for Providing Switch Capability Mediation in a Mobile Telephone System," of Lamb et al., filed Jan. 11, 1997;

2. U.S. application Ser. No. 08/781,264 entitled "Method and Apparatus for Providing Fraud Protection Mediation in a Mobile Telephone System," of Lamb, filed Jan. 11, 1997;

3. U.S. application Ser. No. 08/781,259 entitled "Method and Apparatus for Implementing Alias Mobile ID Numbers in a Mobile Telephone System," of Lamb, filed Jan. 11, 1997;

4. U.S. application Ser. No. 08/781,261 entitled "Method and Apparatus for Implementing Configurable Call Forwarding Bins in a Mobile Telephone System," of Lamb, filed Jan. 11, 1997;

5. U.S. application Ser. No. 08/780,830 entitled "Method and Apparatus for Configuration of Authentication Center Operations Allowed by MSCID in a Mobile Telephone System," of Jacobs et al., filed Jan. 11, 1997;

6. U.S. application Ser. No. 08/781,258 entitled "Method and Apparatus for Configuration of Authentication Center Operations Allowed by System Access Type in a Mobile Telephone System," of Jacobs, filed Jan. 11, 1997;

7. U.S. application Ser. No. 08/781,263 entitled "Method and Apparatus for Authentication Directive initiation Limits in a Mobile Telephone System," of Jacobs, filed Jan. 11, 1997.

BACKGROUND OF THE INVENTION

The invention generally relates to a wireless communication network, and more particularly, relates to an improved authentication center (AC) component in a wireless communication network.

Wireless communication is one of the fastest growing segments of the telecommunication industry. With the mobility of the wireless devices, such as cellular phones and pagers, a subscriber to a wireless service can make or receive a call, or receive a message without being restricted to any particular locations. Because of the convenience provided by wireless devices, they have been widely used by average consumers.

Airtime fraud is a costly problem for wireless communications providers (also called "operators"). Callers (also called "subscribers") can gain unauthorized access to cellular networks by "cloning" legitimate cellular phones (also called "handsets," "Mobile Stations," or "MSs"). The cloning process duplicates the memory contents of a legitimate cellular phone so that the clone cellular phone appears to be legitimate to the rest of the system. In certain high-crime areas, large numbers of cellular phone calls are estimated to be placed from cloned handsets. The challenge to cellular telephone companies lies in determining whether a handset communicating with the system is a legitimate handset or a clone.

In the past, operators could only detect fraudulent access after the fact. The detection process involved labor-intensive post-call analysis and did not stop cloned handsets from fraudulently obtaining service. Currently, many conventional cellular systems include one or more Authentication Center (AC) portions. When a calling person activates a handset, the AC checks the profile of the person who is registered for the handset. The AC then initiates a challenge to the handset. If the handset's response matches the AC's challenge, network access is granted. Otherwise, access is denied. The authentication process greatly reduces airtime losses and serves as a deterrent to the crime of cloning.

In many cellular phone systems, the AC performs authentication in connection with the following events: registration (when a phone roams into a new area); origination of a call; flashing (which involves, e.g., three way calling, call waiting, or paging); and call termination. In general, the MSC (Mobile Switching Center) associated with the area of the handset being authenticated sends an authentication request (AUTHRQST) message to the AC for each of these events.

To further authenticate handsets, conventional ACs periodically send "SSD update" messages and "unique challenge" messages to MSCNLRs in the system. These messages (also called "authentication messages") are defined in the ANSI IS-41 standard produced by TIA/EIA for cellular telephones, which is herein incorporated by reference.

One cause of authentication failures occurs when a subscriber installs a new A-key in his cellular telephone handset. In order for the Authentication Center to authenticate handsets that use a unique (rather than a default) A-key,, a method to enter the A-key into the handset and into the AC is needed. Default A-keys are common to every handset and widely known authentication using only default A-keys is limited in its ability to detect clones and refuse service to them, thereby preventing cellular fraud. The value of the unique A-key must be entered into a subscriber's handset and into the subscriber's record in the AC. When the unique A-key is entered into the AC, it is marked as the "alternate Akey" because it is not known at what point in time the new A-key will be programmed into the handset. Because the authentication process will only authenticate an operation if the A-key in the handset matches the A-key in the AC, it is important to be able to detect the point in time when the new (unique) A-key is programmed into the handset.

When a new A-key is programmed into a handset, any SSD that previously existed in the handset is reset to the default SSD value. Therefore, the entry of a new A-Key into a handset may be detected by the AC when the AC recognizes that the SSD in the handset does not match the SSD maintained by the AC.

In conventional systems, the SSD in the handset was assumed to be bad if either of two situations occur: 1) an AUTHR mismatch or 2) a unique challenge failure. Both of these situations generally arise when the SSD in the handset does not match that in the AC and conventional systems assume that this is the case. In such a situation, conventional systems may attempt an SSD update using the new, unique (or alternate) A-key. If the SSD update works, then authentication succeeds and the new, unique (or alternate) A-key is assumed to be the A-key currently in use by the handset. The problem with conventional systems is that they do not provide the ability to automatically update the A-key when an SSD Update failed. They also did not allow an AC system operator to choose whether or not the automated A-key updating should be performed.

SUMMARY OF THE INVENTION

The present invention provides a method and apparatus for allowing an Authentication Center (AC) to configure whether or not to perform automated A-key updating if an authentication failure occurs. This configuration can be made, for the entire system. The AC has access to a Subscriber database describing, among other things, an "alternate A-key" for at least some of the subscribers. The AC also has access to an MPCM (MSC Point Code Database) that contains configuration information about various ones of the MSCs in the system.

Assuming that the system is configured to allow automatic A-key updating, the described embodiment of the present invention performs an automatic update whenever any of three situations occur during authentication: 1) an AUTHR mismatch occurs, 2) a unique challenge failure occurs, or 3) an SSD update failure occurs for a subscriber who has a unique or alternate A-key.

A fuller understanding of the invention will become apparent and appreciated by referring to the following description and claims taken in conjunction with the accompanying drawings.

BRIEF DESCRIPTION OF THE DRAWINGS

FIGS. 7(a) and 7(b) show a format of an Authentication Request (AUTHRQST) message.

FIGS. 8(a) and 8(b) show parameters of a response to an Authentication Request (AUTHRQST) message.

FIGS. 9(a) and 9(b) show parameters of an Authentication Directive (AUTHDIR) message.

FIG. 10 shows parameters of a response to an Authentication Directive (AUTHDIR) message.

DETAILED DESCRIPTION OF THE PREFERRED EMBODIMENTS

A. General Discussion of Cellular Telephone Technology

The following section provides an overview of cellular telephone technology and serves as a prelude to a more specific discussion of the present invention.

1. System Overview

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in *Signaling System #7*, by Travis Russell, and *The Mobile Communications Handbook*, by Jerry Gibson, both of which are hereby incorporated by reference.

Figure 1:
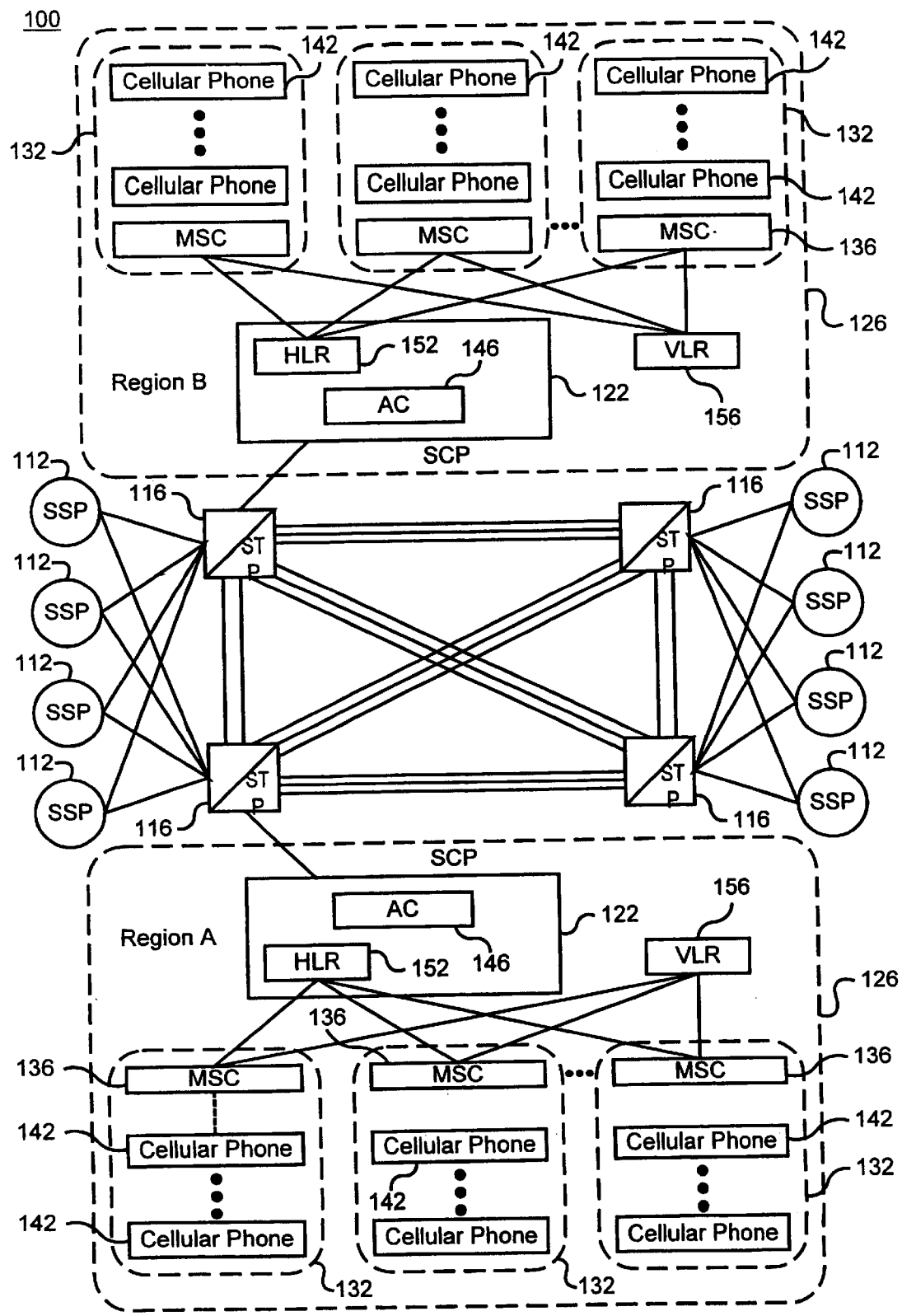
FIG. 1 depicts a typical SS7 communication network.

The SS7 network is used for switching data messages pertaining to connecting telephone calls and for maintaining the signaling network. As shown in FIG. 1, the SS7 network 100 has three different types of nodes or signaling points: Service Switching Point (SSP) 112, Signal Transfer Point (STP) 116, and Service Control Point (SCP) 122.

An SSP 112 is an local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes to a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC) 136. An MSC 136 provides wireless communication services to all properly registered cellular phones 142 in the registration area.

As illustrated in FIG. 1, an SCP 122 contains an Authentication Center (AC) 146 and a Home Location Register (HLR) 152. AC 146 authenticates a subscriber's cellular phone through the use of a number called the A-Key. HLR 152 is used to store information regarding cellular subscribers in the region for which it provides services. HLR 152 also stores information regarding billing, as well as information identifying the services allowed for each subscriber. In addition to these, HLR 152 stores the current locations of cellular phones 142 of those subscriber's who activated their cellular phones through a wireless service provider in the region the HLR serves. This region is also referred to as the "home area" of those subscribers. Although not shown, a backup HLR is also provided in SCP 122. A VLR 156 is used when a cellular phone 142 is not recognized by a local MSCNLR 156 and stores the current locations for the visiting subscribers.

Each cell phone (MS) connects to a base station through a connection 127. A MSCNLR connects to one or more base stations. This connection includes a voice channel and a control channel, which is usually implemented as a radio channel.

2. Registration and Roaming

Figure 2:
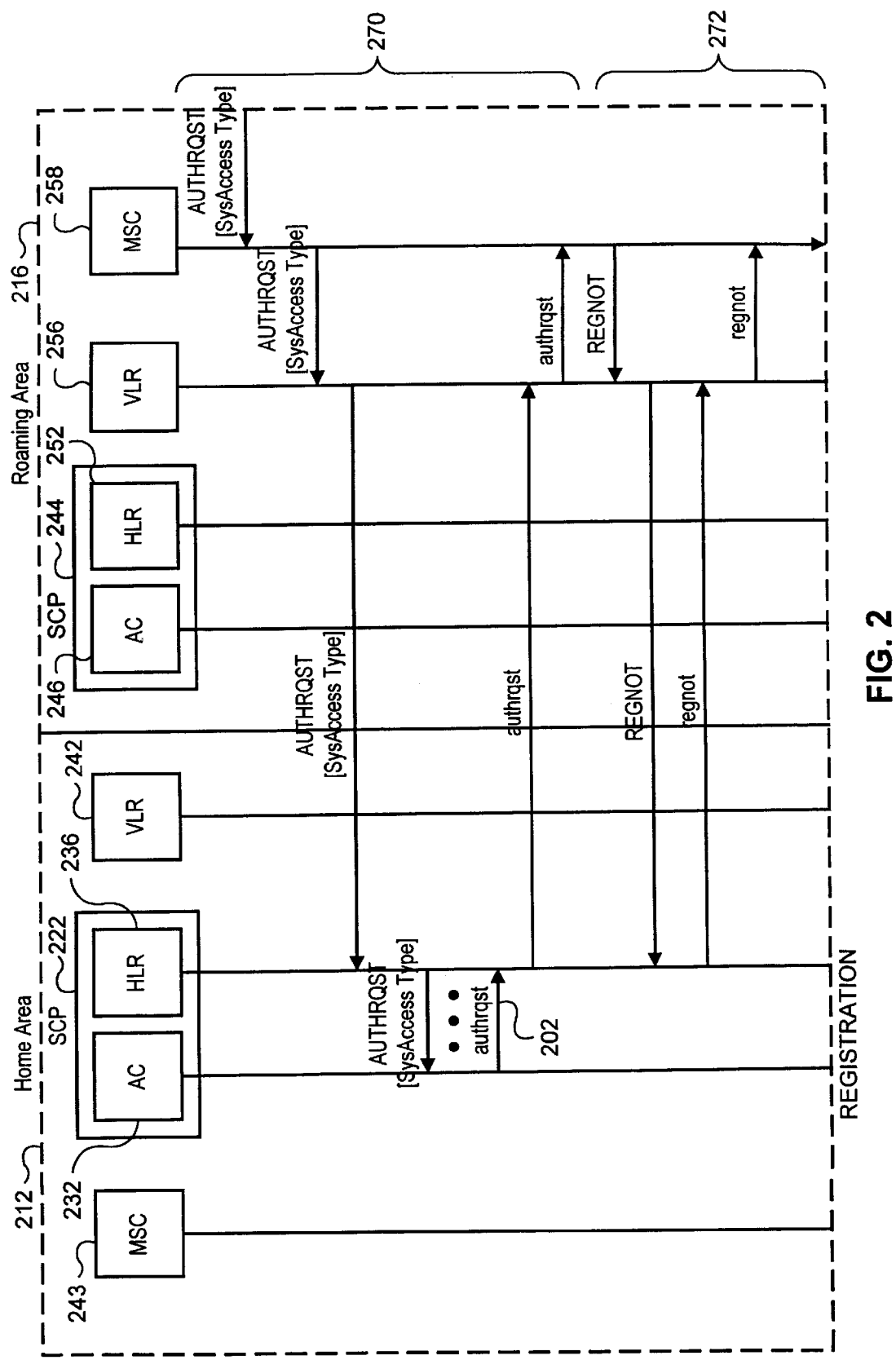
FIG. 2 is a flow diagram of steps performed when a roaming cellular telephone enters a new roaming area.

FIG. 2 illustrates registration of a cellular phone that has "roamed" outside of its home area 212 into a roaming area 216. Home area 212 and roaming area 216 correspond to two regions, such as regions A and B, respectively, shown in FIG. 1. In home area 212, an SCP 222 includes an AC 232 and a HLR 236. An MSC 243, having an associated VLR 256 jointly called an "MSCNLR"), is also located in home area 212. In roaming area 216, an SCP 244 includes an AC 246 and a HLR 252. An MSC 258 is also located in roaming area 216. In FIG. 2, although MSCs are shown as separate entities from the HLR and VLR in the respective areas, in a actual application the HLRNLR functions may be integrated with the MSCs.

When an MSCNLR detects that a phone capable of authentication has roamed into its area, the MSCNLR sends Authentication Request (AUTHRQST) messages to the AC. As shown in FIG. 2, when a cellular phone roams into a new area, it sends an AUTHRQST message, which is received by the MSC 258 for the area. MSC 258 and AC 232 exchange a plurality of AUTHRQST messages 270, and the AC sends back a response indicating whether the phone is allowed to operate in the new area. (In FIG. 2, responses to messages are indicated by lower case letters). After the phone has been authenticated, it registers its location with its home HLR 222, as shown by messages 272. Both AUTHRQST and REGNOT messages are well-known to persons of ordinary skill in the art and will not be described in detail herein.

3. Call Origination

Figure 3:
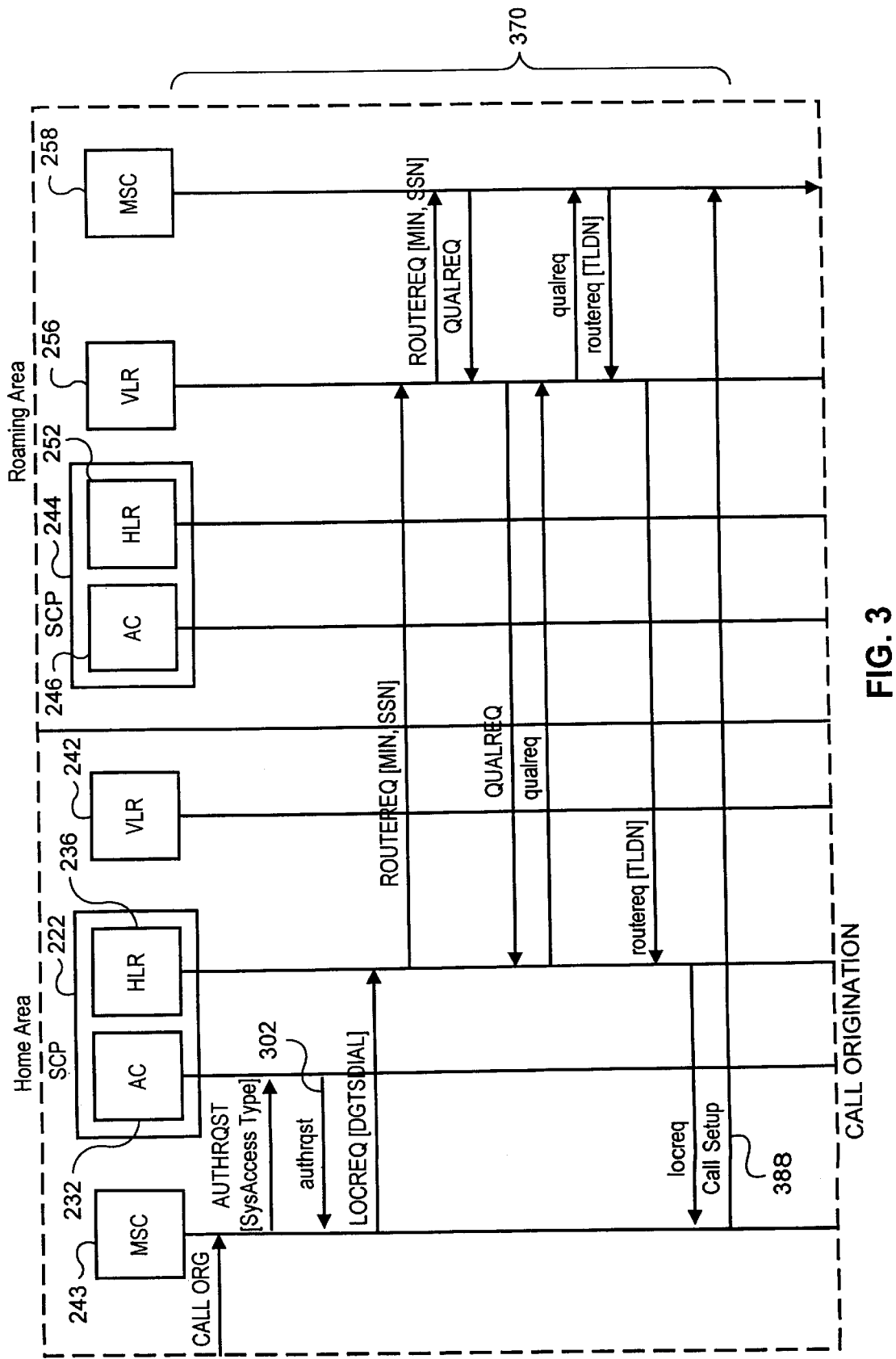
FIG. 3 is a flow diagram of steps performed when a call is made from one area to another.

As shown in FIG. 3, when a calling party desires to place a call to a receiving party, the phone sends a call origination (CALL ORG) message, which includes the digits of the phone number to be dialed. Again, the MSCNLR and AC exchange AUTHRQST messages, to ensure that the calling phone has authorization to place a call.

Originating MSC 243 sends a location request (LOCREQ) message containing the dialed digits to HLR 236 in home area 212. Upon receiving the dialed digits, the HLR 236 accesses its internal data structures to find the associated Mobile identification Number (MIN) for the receiving party's cellular phone, in the SUBS file to determine if the receiving party is a legitimate subscriber. HLR 236 sends a routing address request (ROUTREQ) message to VLR 256 in roaming area 216 where the receiving party's cellular phone is currently registered. The current location information about the receiving party's cellular phone was sent to HLR 236 by VLR 256 after the receiving party arrived the roaming area and the cellular phone registered with VLR 252. The ROUTREQ message contains the associated MIN of the receiving party's cellular phone. VLR 256 then forwards the ROUTREQ to MSC 258 currently serving the receiving party's cellular phone. MSC 258 is also referred to as a serving MSC. In response to the ROUTREQ, serving MSC 258 consults its internal data structures to determine if the receiving party's cellular phone is already engaged in a call on this MSC. Assuming that the cellular phone is not known to serving MSC 258, serving MSC 258 may then obtain the receiving party's profile from its VLR 256 by sending it a qualification request (QUALREQ) message. If the receiving party's cellular phone is unknown to VLR 256 or if the information requested is not available at VLR 256, VLR 256 sends the QUALREQ message to HLR 236 in home area 212. HLR 236 then sends a qualreq response to VLR 256. The qualreq response contains relevant information about the receiving party's profile. VLR 256 in turn sends the qualreq response to serving MSC 258. Upon receiving the qualreq, serving MSC 258 allocates a temporary identifier TLDN (Temporary Local Directory Number) and returns this information to VLR 256 in the routreq message. VLR 256 in turn sends the routreq message to HLR 236. When the routreq message is received by HLR 236, it returns a locreq response to originating MSC 243. The locreq response includes routing information including the MSCID of serving MSC 258 and the TLDN. Finally, originating MSC 243 establishes a voice path to serving MSC 258 using existing interconnection protocols (e.g., SS7) and the routing information specified in the locreq response, as illustrated at step 388.

4. SSD Updates and Unique Challenges

The described embodiment of the present invention uses the CAVE (Cellular Authentication and Voice Encryption) algorithm to authenticate cellular phones in the system. The CAVE algorithm is described, for example, in TR-45, which is herein incorporated by reference. Using the CAVE algorithm, the AC periodically orders an MSCNLR to perform one or both of an SSD update or a unique challenge operation. These orders are typically included as a part of other messages sent by the AC. For example, in FIGS. 2 and 3, the AC may issue SSD update orders and unique challenge orders as a part of any of the messages it sends to an MSCNLR. Thus, for example, authrqst message 202 of FIG. 2 may or may not include an order to perform an SSD update or to perform a unique challenge. Similarly, authrqst message 302 of FIG. 3 may include such orders if the AC determines that they are needed for a particular subscriber. The format of these orders are discussed below. The parameters of an authrqst response are discussed below.

Figure 4A:
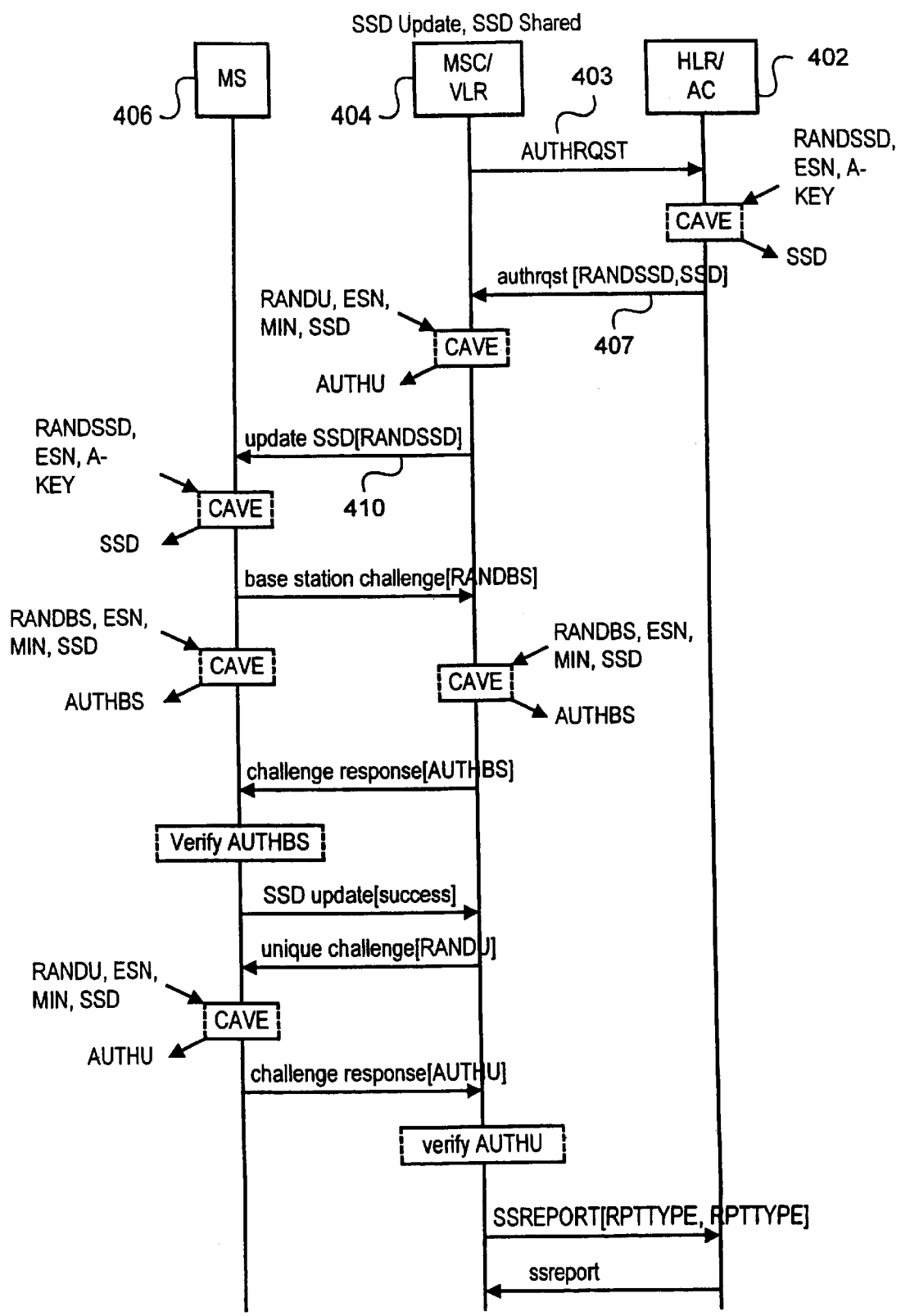
FIG. 4(a) is a flow diagram of an SSD update operation when the system allows an AC to share Shared Secret Data (SSD) with an MSC.
Figure 4B:
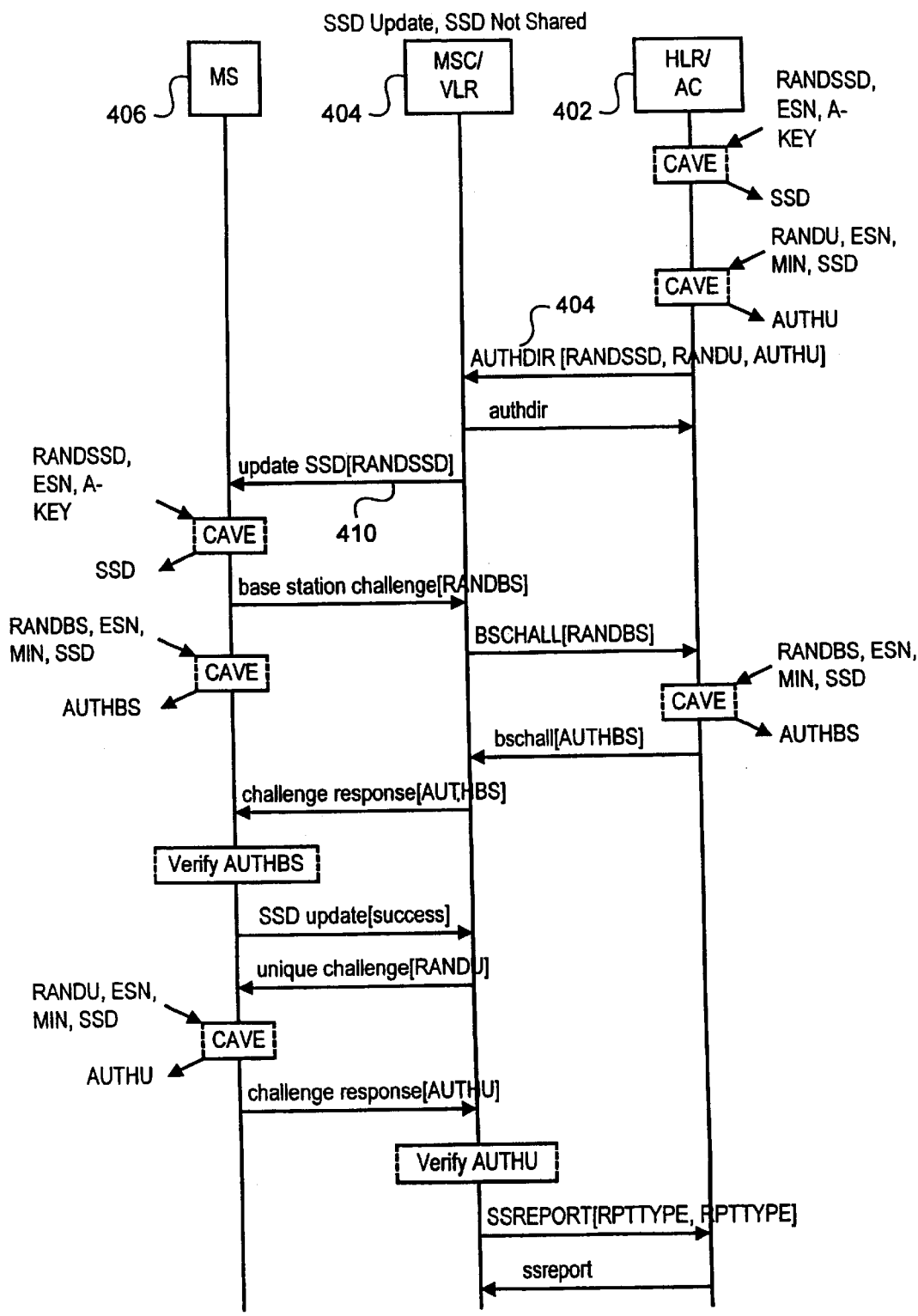
FIG. 4(b) is a flow diagram of an SSD update operation when the system does not allow an AC to share Shared Secret Data (SSD) with an MSC.

FIG. 4(a) is a flow diagram of an SSD update operation when the system allows the AC to share SSD (Shared Secret Data) with the VLR. In contrast, FIG. 4(b) is a flow diagram of an SSD update operation when the system does not allow an AC to share SSD. FIGS. 4(a) and 4(b) also include a handset (called a "Mobile Station" or "MS") 406. SSD is a parameter defined in the IS-41 standard. It is used as an intermediate input value to the CAVE algorithm and is stored in both the AC and MS. As indicated in the figures, some MSCNLRs are allowed to have access to SSD and some are not, depending on how the system is configured.

In FIG. 4(a), the orders to perform an SSD update (and a unique challenge) are incorporated into the authrqst response messages 407. The format of an authrqst response message is discussed below. In FIG. 4(b), the orders to perform an SSD update (and a unique challenge) are incorporated into the AUTHDIR message 404. The format of an AUTHDIR message is discussed below. The specific messages sent during SSD update are not the subject of the present invention.

5. Authentication Center (AC)

Figure 5A:
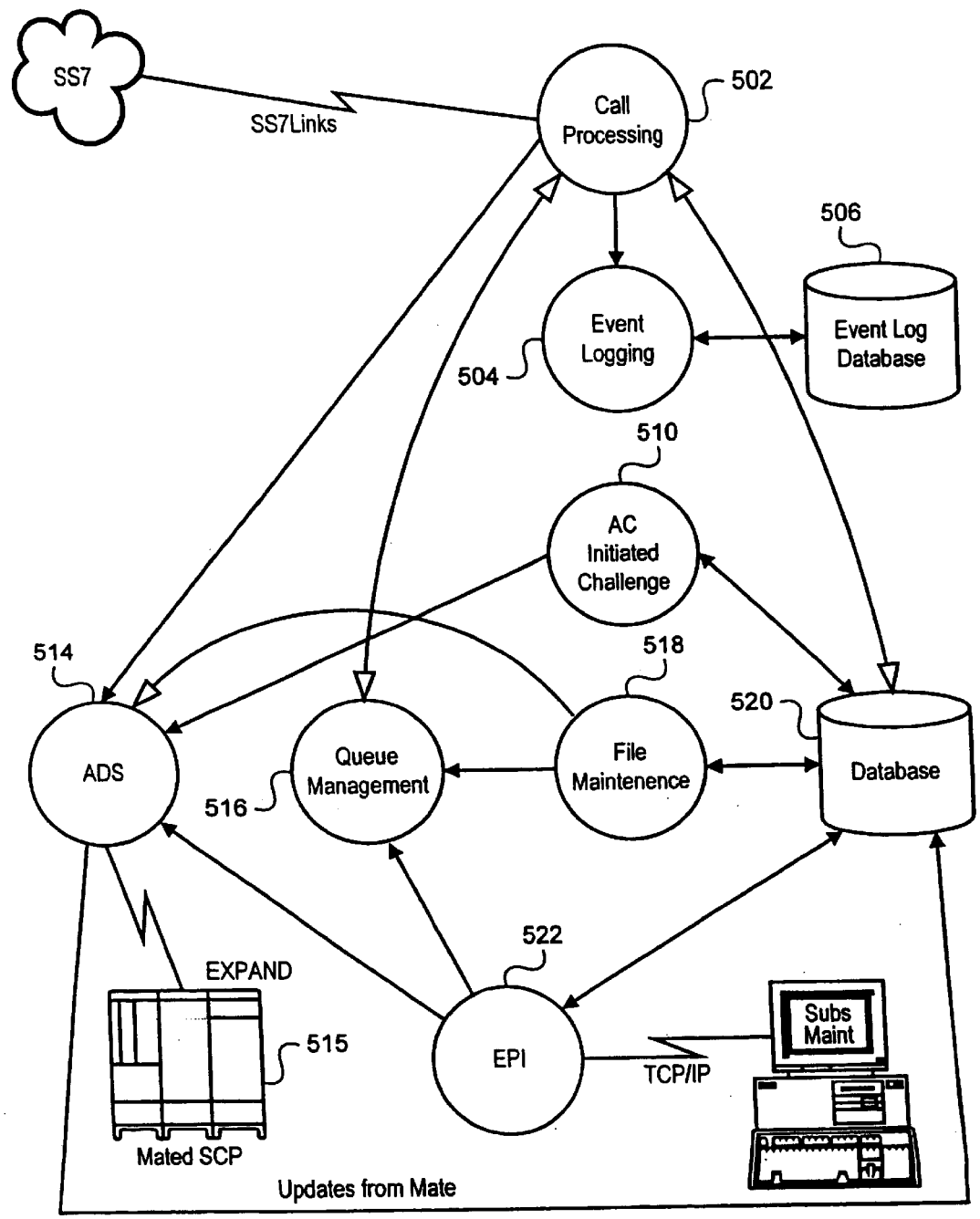
FIG. 5(a) is a block diagram of subsystems in an AC of a preferred embodiment of the present invention.
Figure 5B:
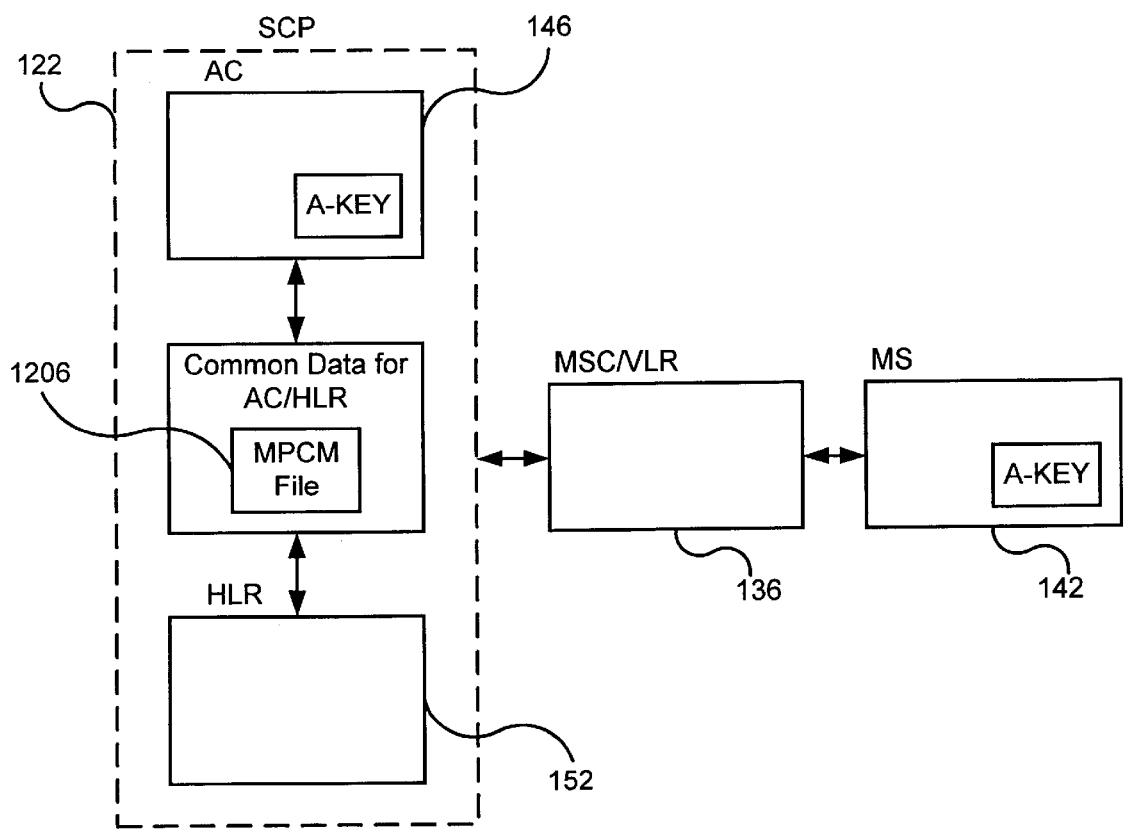
FIG. 5(b) is a block diagram showing an AC, MPCM file, an HLR, an MSCNLR, and an MS in accordance with the present invention, where the AC and MS contain an A-key.

FIG. 5(a) is a block diagram of subsystems in an AC of a preferred embodiment of the present invention. FIG. 5(b)

is a block diagram of an AC, HLR, MSCNLR, and MS, showing the A-Key value that is stored only in the AC and the MS. In the example, the MSC is allowed to "share" SSD data, so the AC will send the SSD data to the MSC. If the MSC is not allowed to share SSD, the AC will not send the SSD to that MSC. The AC and the HLR can both access the MPCM file, which contains information about the configuration of various MSCs, indexed by MSCID.

It will be understood that each of the subsystems of FIGS. 5(a) and 5(b) is implemented as software instructions stored in a memory and executed by a processor. An AC Call Processing subsystem 502 is responsible for processing of authentication TCAP messages. Thus, AC call processing subsystem 502 handles the following IS-41 authentication messages and associated responses:

Authentication directive,
Authentication Failure Report,
Authentication Request,
Authentication Status Report,
Base Station Challenge,
Security Status Report.

Each of the above messages (except the Base Station Challenge) can contain orders for an SSD update and/or a unique challenge. Processing of messages includes message parsing, message validation, decision logic processing, event generation, statistics generation, message creation, and message sending. Inbound messages are received from an HLR. Responses to a message are returned to the same HLR. Outbound messages are preferably generated from the processing of a queue message received from a Queue Management Facility (external to the AC).

AC Call Processing subsystem 502 is also responsible for generation of various required random numbers and the generation of Secret Shared Data (SSD). The AC Call Processing subsystem preferably supports the Authentication Algorithm Version C7, and is structured such that the library routines used for the CAVE algorithm and for random number generation can be easily replaced or enhanced. Subsystem 502 also includes library routines for the encryption/decryption of sensitive data used by the CAVE algorithm.

AC Call Processing subsystem 502 will also receive challenge due notification messages from an AC Initiated Challenge subsystem 510 via the external Queue Management Facility. These messages include "Initiate Immediate SSD Update" and "Initiate Unique Challenge" events.

AC Call Processing subsystem 502 is also responsible for the generation of log events to be sent to the AC Event Logging subsystem 504 for collection and recording in database 506.

An ADS Subsystem 514 is responsible for communicating with a "mated" SPC 515 and for ensuring that the databases of the two systems remain in synch. An External Provisioning Interface (EPI) 522, available from Tandem Computers, Inc., provides subscriber and subscriber A-keys using ANSI-1 standard messages.

AC Initiate Challenge subsystem 510 is composed of the AC Initiated Challenge Process, which is responsible for the Authentication Center initiation of periodic authentication verification and SSD updates on a per subscriber basis. AC Initiated Challenge subsystem 510 uses the configuration information provided by an Authentication System Parameters (ACSP) file to determine whether or not periodic unique challenges are in effect, whether or not periodic SSD updates are in effect, and to determine the associated frequency and interval characteristics of the updates and challenges.

To help reduce fraud by randomizing these operations, the amount of time between challenges initiated by the AC Initiated Challenge subsystem 510 is variable based upon the last authentication attempt timestamps from the Subscriber Authentication Profile File (SUBA) and upon the AC initiated challenge frequency and interval width information configured in the ACSP file.

The AC initiated frequency is defined as the desired average frequency of occurrence of a challenge. The AC initiated challenge interval width is defined as the total width of the interval for the AC initiated frequency. For example, if the authentication challenge had an AC initiated frequency of 120 minutes and an AC initiated interval width of 60 minutes, the authentication challenges for a particular subscriber would occur randomly between 90 and 150 minutes.

The AC Initiated Challenge Process will sequentially examine each subscriber in the Subscriber Authentication Profile File (SUBA) to determine if it is time to initiate a unique challenge or SSD update for the subscriber. For each SUBA record, the AC Initiated Challenge Process 510 calculates the subscriber's "time to do unique challenge", and "time to update SSD". If any of these calculated timestamps are less than or equal to the current timestamp, the AC Initiated Challenge Process 510 will update the subscriber record to indicate the operation is needed. The operation will then be performed on the next access of the system by the subscriber. The formulas for the calculation of these subscriber challenger timestamps are defined below.

Multiple copies of the AC Initiated Challenge process 510 can be configured for each SCP node with each copy having a subset of the Subscriber Authentication Profile File (SUBA). The subsets will be partitioned among the various copies of the AC Initiated Challenge Process based upon the primary key of the SUBA file. This partitioning methodology allows for balanced workload and prevents I/O contention on the SUBA file.

The following formulas are used for the calculation of the three subscriber challenge timestamps:

LADT=last unique challenge attempt timestamp from the subscriber SUBA record
LSDT=last SSD update attempt timestamp from the subscriber SUBA record
AF=AC initiated unique challenge frequency ($X_1$) from ACSP file (minutes)
AV=AC initiated unique challenge width ($X_1$) from ACSP file (minutes)
SF=AC initiated SSD update frequency ($X_2$) from ACSP file (days)
SV=AC initiated SSD update width ($X_2$) from ACSP file (days)
R=Random number between 0 and 1

The "time to do unique" challenge timestamp is calculated as follows;

$$LADT+AF+(R-0.5)*AV$$

The "time to update SSD" challenge timestamp is calculated as follows;

$$LSDT+SF+(R-0.5)*SV$$

B. Automated A-Key and SSD updating

Figure 6A:
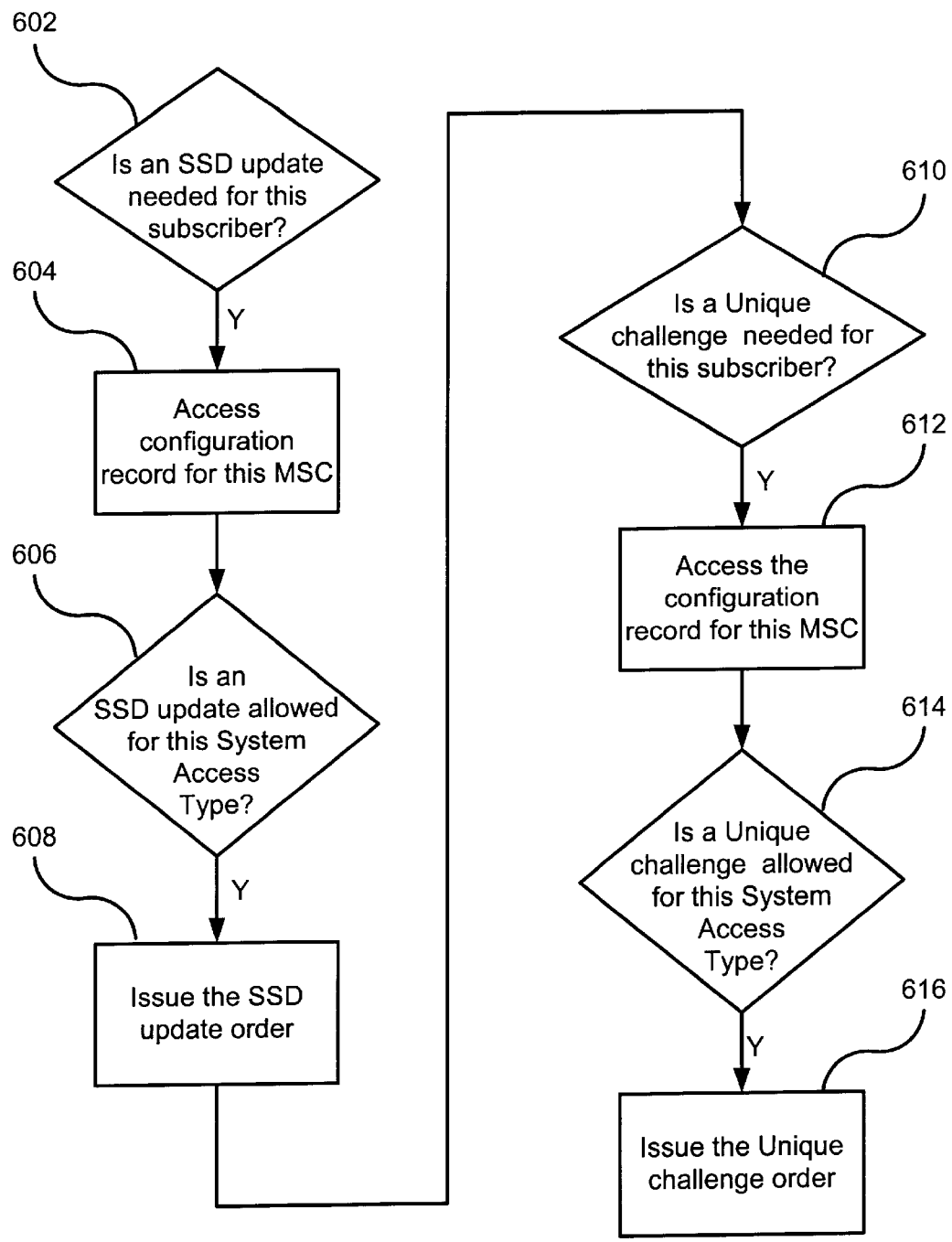
FIG. 6(a) is a flow chart showing steps performed by the AC to send SSD updates and unique challenges in accordance with a preferred embodiment of the present invention.
Figure 6B:
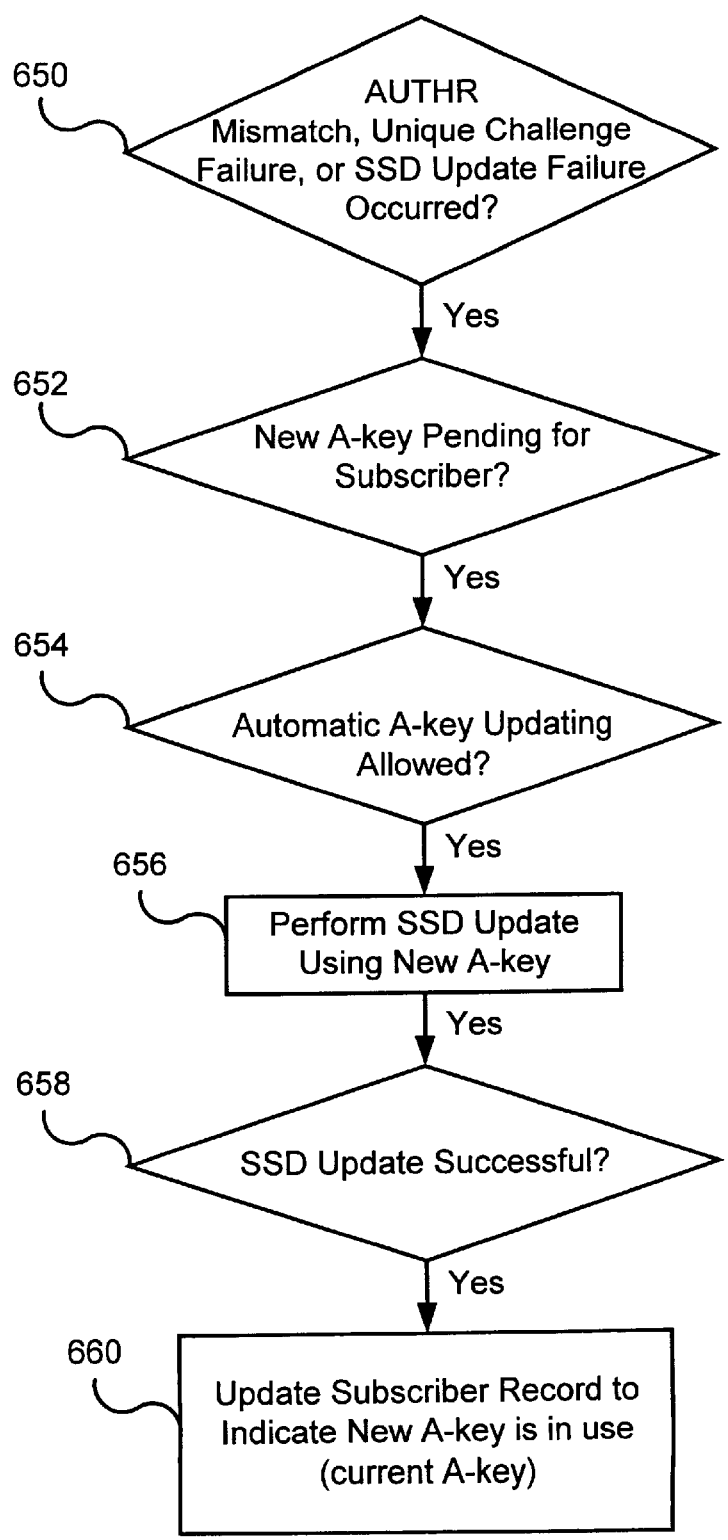
FIG. 6(b) is a flow chart showing steps performed by the AC when an authentication error occurs in accordance with a preferred embodiment of the present invention.

FIGS. 6(a) and 6(b) are flow charts showing step performed by the AC in accordance with a preferred embodiment of the present invention. A general discussion is followed by a detailed discussion of message and file formats and by an example. Columns marked either "R" or "C" indicate that the field is required or contingent (optional).

Figure 14:
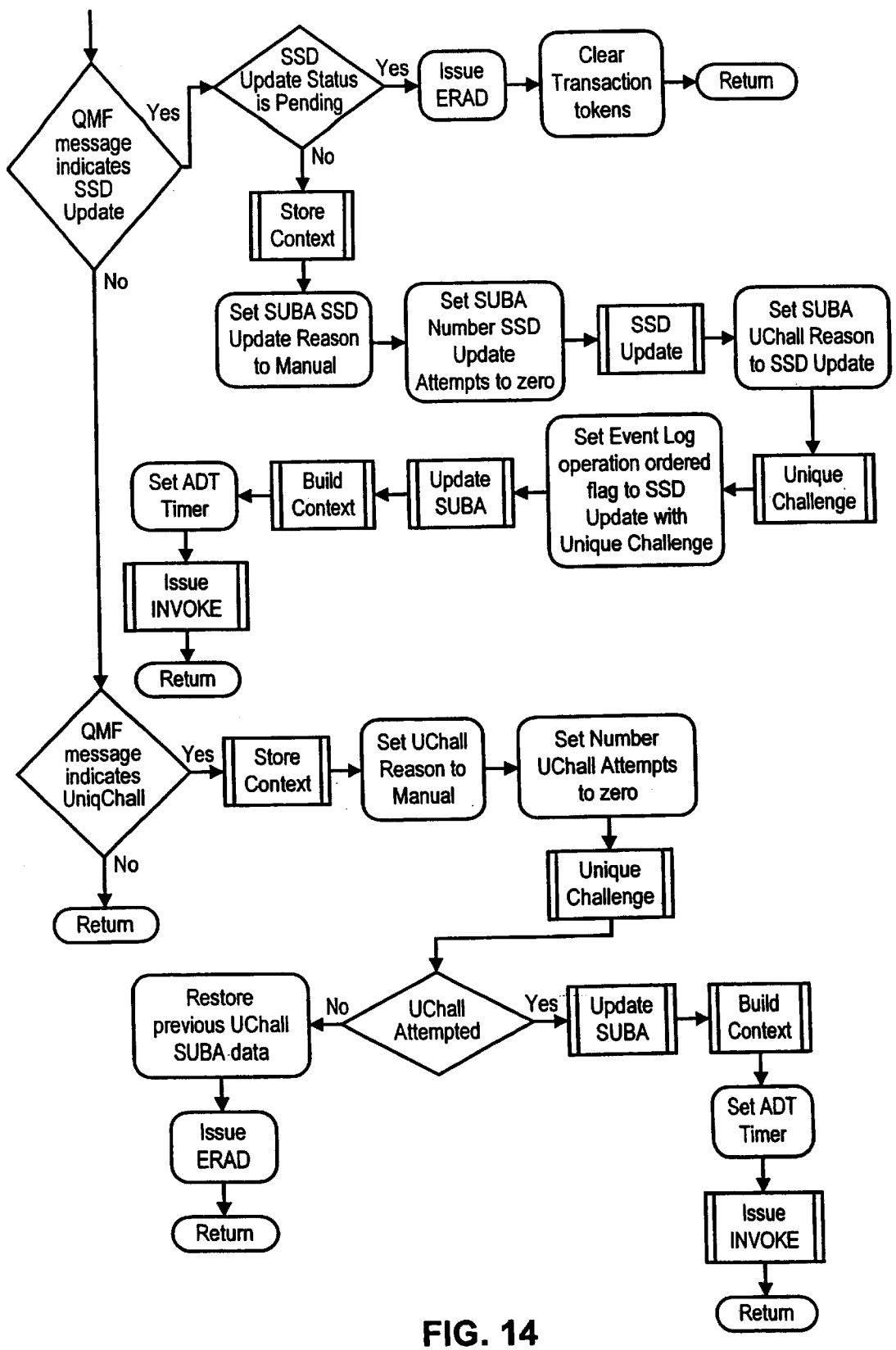
FIG. 14 is a flowchart of steps performed by the AC to order an SSD update and to order a unique challenge.

Before the AC sends a message, the AC Call Processing subsystem 510 determines, in step 602, whether an SSD update event is required for the subscriber to whom the message is directed. If so, in step 604, the AC accesses a record in the MSPCM file for the MSC form which the message was received to determine whether an SSD update is allowed for messages having a system access type of the message being processed. If the record in the MSPCM file indicates that an SSD update is allowed for the type of message being processed, then, in step 608, the AC orders the SSD update to be included in the message to be sent (as shown in FIG. 14).

Similar steps are performed when a unique challenge is due. Before the AC sends a message, the AC Call Processing subsystem 510 determines, in step 610, whether a unique challenge event is required for the subscriber associated with the message. If so, in step 612, the AC accesses a record in the MSPCM file for the MSC from which the message was received to determine whether a unique challenge is allowed for messages having a system access type of the message being processed. If the record in the MSCPM file indicates that a unique challenge is allowed for the type of message being processed, then, in step 616, the AC orders the unique challenge to be included in the message to be sent (as shown in FIG. 14).

Figure 11A:
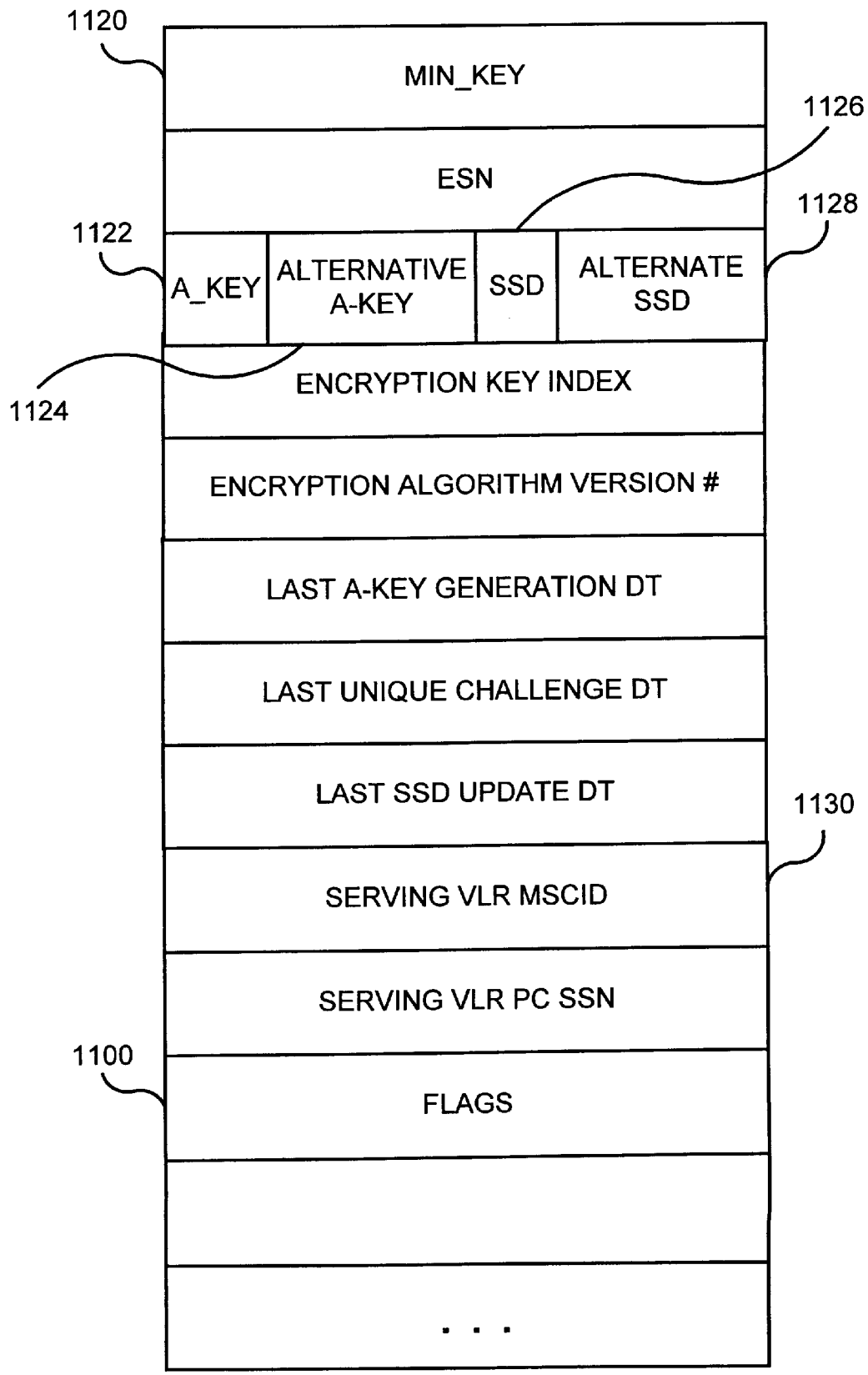
FIG. 11(a) shows a format of a Subscriber file (SUBA).
Figure 11B:
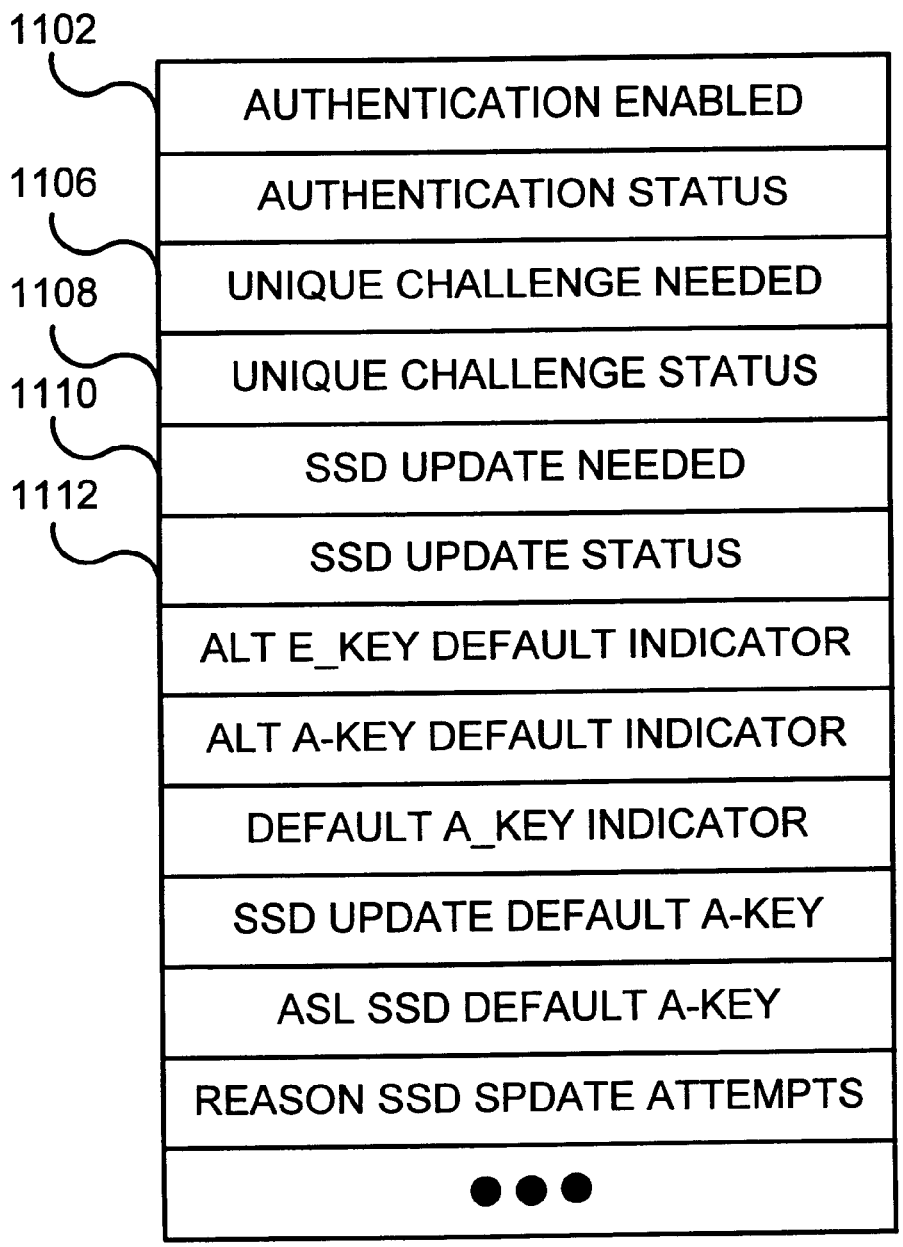
FIG. 11(b) shows a format of flag bits in the Subscriber (SUBA) file.

FIG. 6(*b*) is a flow chart showing steps performed by the AC when an authentication error occurs in accordance with a preferred embodiment of the present invention. In the described embodiment, there are three types of authentication failures that can indicate that a new A-Key has been installed in a handset:

1) Unique Challenge Failure (AUTH mismatch)
2) SSD Update Failure
3) AUTHR Mismatch When the AC detects (or receives a report indicating) that any one of these three events has occurred, the AC examines a record of the Subscriber database (shown in FIG. 11(*a*)) for the presence of an alternate A-Key in field 1124. An alternate A-Key is an A-Key that has been provisioned in the AC, but is not yet known to be installed in the handset. If the record indicates that a new A-Key is pending (i.e., waiting to be programmed into the handset), and the system is configured to perform automated A-Key updating, the AC will order, that an SSD update be performed using the pending A-Key to calculate the new SSD. If this SSD update is successful, the AC marks the pending A-Key as the current A-Key in step 668 and processing continues, since the A-keys in the AC and MS now match. If the SSD update is not successful, the AC assumes that an authentication failure occurred for some other reason and continues processing accordingly.

Figure 16:
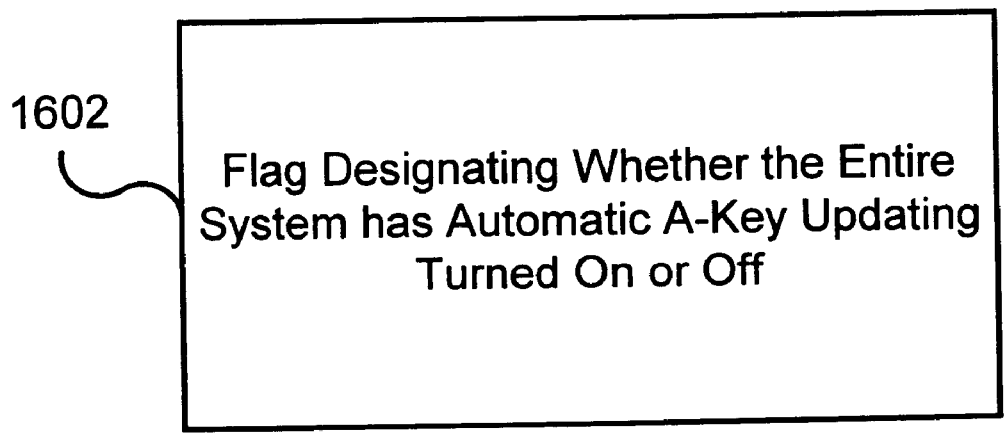
FIG. 16 shows a flag used in a preferred embodiment of the present invention to indicate whether the entire system is configured for Automatic A-key updating.

As shown in FIG. 16, a preferred embodiment of the invention uses a single flag in a memory of the AC to indicate whether automated A-Key updating is turned on or off The following section describes message and file formats used by the system. These formats are known to persons of ordinary skill in the art and are included here for clarity of example. Only relevant fields are discussed. Columns marked either "R" or "C" indicate that the field is required or contingent (optional).

FIGS. 7(*a*) and 7(*b*) show parameters in an Authentication Request (AUTHRQST) message. This message is sent from an MSCNLR the AC. Mobile Identification Number (MIN) 702 identifies the subscriber making the request. Steps 602 and 604 of FIG. 6 check flags 1106 and 1110 of FIG. 11 to determine whether an SSD update or unique challenge needs to be sent for the subscriber having the MIN in field 702. Alternate embodiments may use additional methods to determine if an SSD update or unique challenge needs to be sent.

A System Access Type 704 identifies the type of system access made by the MS. In the described embodiment, the possible system access types are:

0—not used
2—Flash request
1—Unspecified
3—Autonomous registration
4—Call origination
5—Page response
6—No access
7—Power down registration
8—SMS page response.

Steps 606 and 614 of FIG. 6 access this field to determine the operation that the MS wants authorization to perform.

An MSCID 706 indicates the ID of the MSCNLR forwarding the AUTHRQST message. Steps 604 and 612 access the MPCM file using this MSCID as a key to determine the system access types for which the particular MSCNLR will perform to an SSD update or a unique challenge.

FIGS. 8(*a*) and 8(*b*) show parameters of a response to an Authentication Request (AUTHRQST) message of FIG. 7. This response is returned by the AC in response to an AUTHRQST message from an MSCNLR and may include an SSD update and/or a unique challenge. When the AC issues an SSD update order in step 608 of FIG. 6, values are placed in RANDSSD field 804. When the AC issues a unique challenge order in step 616 of FIG. 6, values are placed in AUTHU field 802 and RANDU field 804. In this way, the SSD update or unique challenge is passed to the MSCNLR with the AC's response to the AUTHRQST message. This SSD will also be sent if it is to be shared.

FIGS. 9(*a*) and 9(*b*) show parameters of an Authentication Directive (AUTHDIR) message. This message is sent from the AC to an MSCNLR. Steps 602 and 604 of FIG. 6 use a MIN later stored in field 902 to determine whether an SSD update or unique challenge needs to be sent for the subscriber. Steps 604 and 612 access the MPCM file using this MSCID as a key to determine the conditions that the particular MSCNLR will perform an SSD update or a unique challenge and may include an SSD update and/or a unique challenge. When the AC issues an SSD update order in step 608 of FIG. 6, values are placed in RANDSSD field 904. When the AC issues a unique challenge order in step 616 of FIG. 6, values are placed in AUTHU field 903, RANDU field 904, and SSD field 908. In this way, the SSD update or unique challenge is passed to the MSC/VLR with the AC's response to the AUTHRQST message.

FIG. 10 shows parameters of a response to an Authentication Directive (AUTHDIR) message.

FIG. 11(*a*) shows a format of a Subscriber (SUBA) file. This file includes a Min key field 1120, an A-Key field 1122, an alternate A-Key field 124, an SSD field 1126, and an alternate SSD field 1128. The file also includes flags that are shown in detail in FIG. 11(*b*). Note that the Subscriber database also includes the MSCID 1130 of the VLR currently serving the phone if it is roaming.

FIG. 11(*b*) shows a format of flag bits in a Subscriber (SUBA) file. As discussed above, the MIN for each subscriber is used as a key for this file. The flags include an authentication enabled flag 1102, indicating whether the AC is to perform authentication for the subscriber; an authentication status flag 1104; a unique challenge needed flag 1106; a unique challenge status flag 1108; an SSD update needed flag 1110; and an SSD update status flag 1112. Other flags exist that are not shown in the FIGS. 12(*a*) and 12(*b*) show a format of an entry in an MSC Point Code Map (MSPCM) file, which uses an MSC ID as a key. An "SSD Sharing allow flag" 1206 indicates whether SSD should be shared with this MSCNLR. Each entry in the MPCM preferably includes two bytes of flags 1204, which are shown in detail in FIG. 12(*b*). Byte 1 contains the following flags:

H=reserved
G=Reserved
F=Page response for SSD update
E=Call origination for SSD update
D=Autonomous registration for SSD update
C=Flash for SSD update
B=Unspecified for SSD update
A=Other for SSD update Byte 0 contains the following flags:

H=Reserved
G=Reserved
F=Page response for unique challenge
E=Call origination for unique challenge
D=Autonomous registration for unique challenge
C=Flash for Unique challenge
B=Unspecified for unique challenge
A=Other for unique challenge In these flags, "0" is false and "1" is true.

Figure 12A:
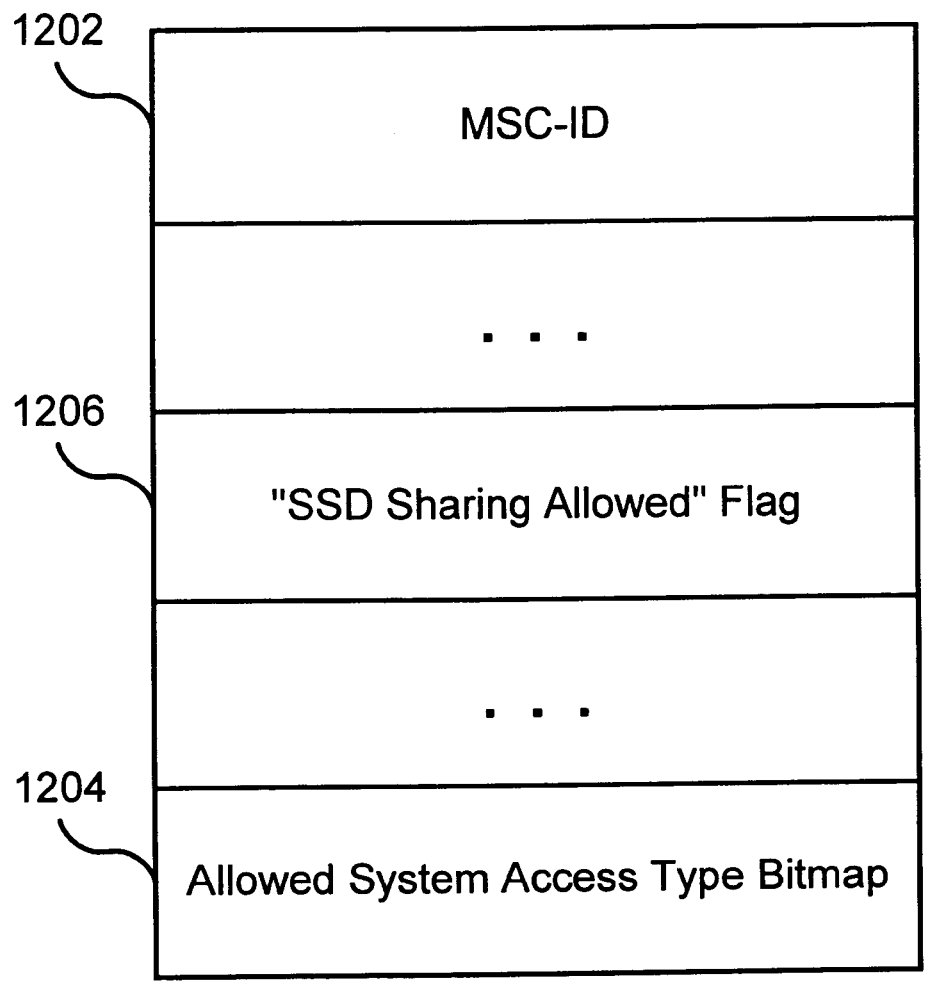
FIGS. 12(a) and 12(b) show a format of an entry in an MSC Point Code Map (MSCPM) file.
Figure 12:
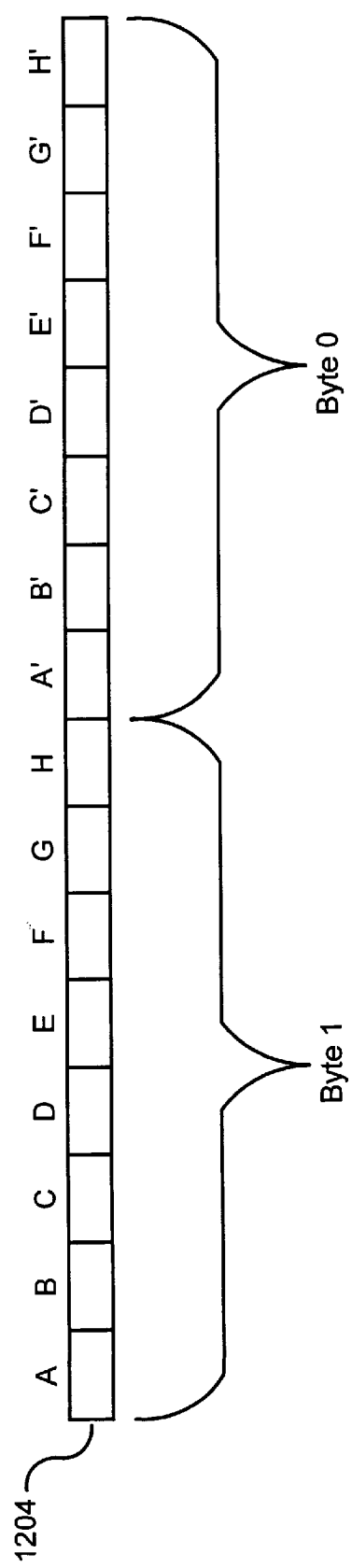
Figure 13:
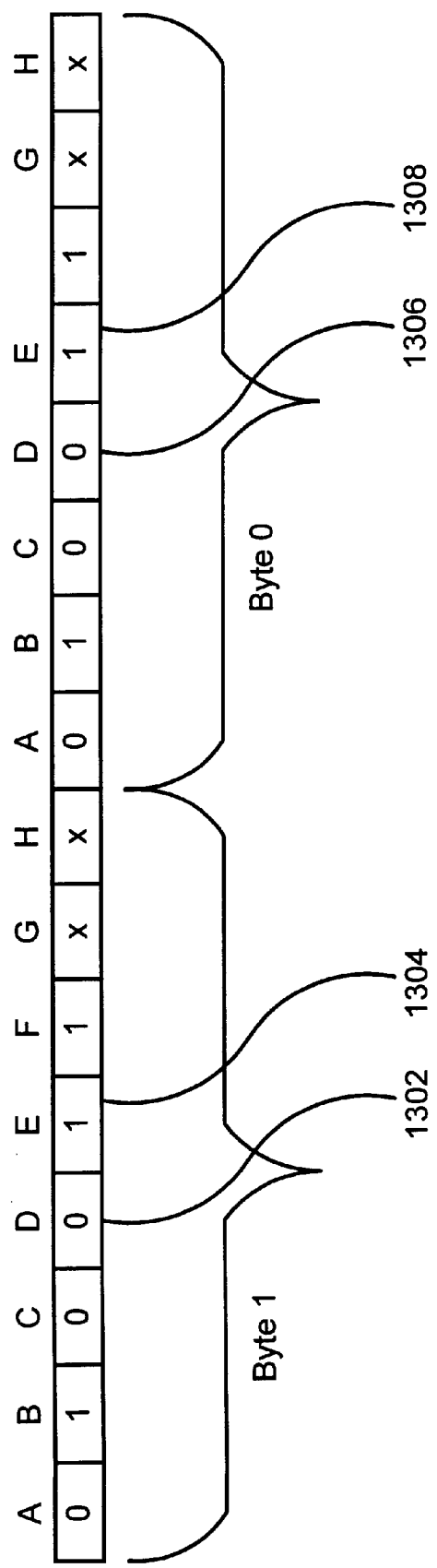
FIG. 13 show an example of values for flags of FIG. 12(b).

FIG. 13 show an example of values for flags of FIG. 12(*b*). In the example, flag 1304 indicates that the MSCNLR having the MSC ID in field 1202 of FIG. 12 will initiate SSD updates sent in response to a call origination message (as indicated by system access type field 704 of FIG. 7(*a*)). Flag 1302 indicates that the MSCNLR will not perform SSD updates sent in response to an autonomous registration message. Flag 1308 indicates that the MSCNLR will perform a unique challenge sent in response to a call origination message. Flag 1306 indicates that the MSCNLR will not perform a unique challenge sent in response to an autonomous registration message. Thus, in the example, the AC will send an SSD update and a unique challenge for this MSCNLR when the message is a call origination message, but not when the message is an autonomous registration message. In the example, a human operator has initially set the bits of FIG. 12(*b*) to indicate the capabilities of the MSCNLR sending the message. Thus, for example, an MSCNLR that uses a voice channel to order SSD updates will have a "0" in flag 1302, while an MSCNLR that uses a radio channel to initiate MSCNLR updates will have a "1".

FIG. 14 is a flowchart of steps performed by the AC to order an SSD update and to order a unique challenge.

Figure 15:
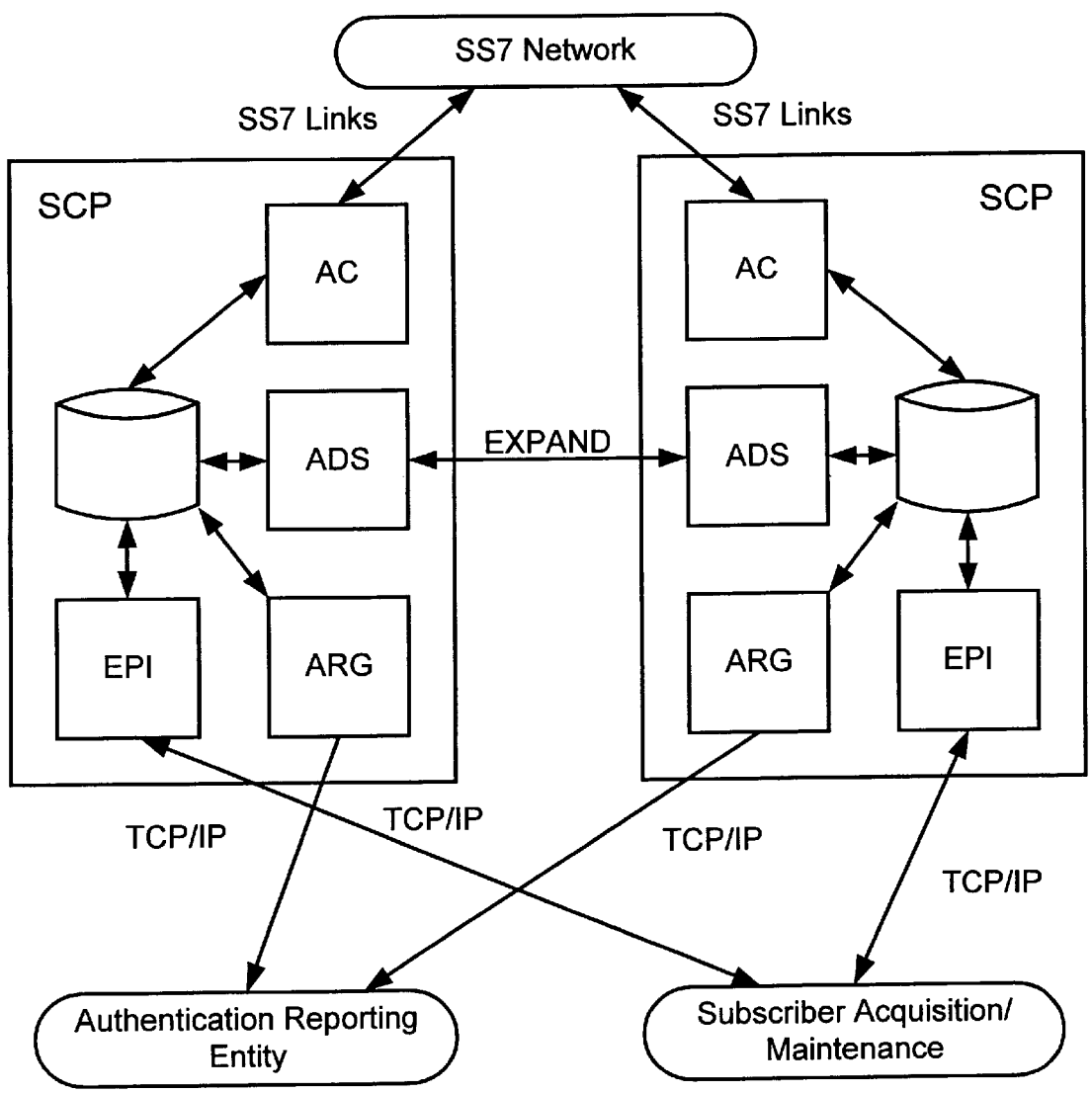
FIG. 15 shows another embodiment of the preferred invention incorporating mated SCPs.

FIG. 15 shows another embodiment of the preferred invention incorporating mated SCPs. In FIG. 15, each AC operates in a mated SCP environment with separate AC applications and databases on two physically separated SCP nodes. The mated SCP environment allows subscriber service processing to continue in the event that one of the SCP nodes is no longer accessible to the SS7 network. As a consequence, updates to one AC database must be applied to the associated AC database on the mated SCP node. Tandem's Application Database Synchronization (ADS) subsystem provides the database management services for the synchronization of the AC databases between the mated SCP nodes.

In summary, the present invention allows an Authentication Center (AC) in a cellular telephone system to automatically update the "current" A-key for a subscriber if the AC determines that the new A-key has been programmed into the handset.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for sending an updated Authentication-Key (A-Key) value in a cellular telephone system, comprising the steps, performed by a processor of an Authentication Center (AC) portion of the system, of:

finding that an authentication with a first A-Key has failed for a handset in the system;

determining whether the system is configured to allow automated A-Key updating for the Mobile Switching Center/Vistor Location Register (MSC/VLR) associated with the handset;

obtaining an alternate A-Key value if the result of the determining step is true;

generating Shared Secret Data (SSD) using the alternate A-Key if the result of the determining step is true; and performing an SSD update by sending an SSD update message to the MSC/VLR associated with the handset if the result of the determining step is true.

2. The method of claim 1, further comprising the following steps:

determining, when the SSD update is unsuccessful, that the A-Key in the handset is not the reason for the authentication failure; and determining, when the SSD update is successful, that the A-Key in the handset was the reason for the authentication failure.

3. The method of claim 1, wherein the step of determining that an authentication failure has occurred for a handset in the system includes detecting at least one authentication failure from a group including: a unique challenge failure, an SSD update failure, and an AUTHU mismatch.

4. The method of claim 1, wherein the step of determining whether the system is configured to allow automated A-Key updating for the MSCNLR associated with the handset includes checking a system-wide flag to determine whether automated A-Key updating is allowed.

5. The method of claim 1, wherein the step of determining whether the system is configured to allow automated A-Key updating for the MSCNLR associated with the handset includes checking a flag for the MSCNLR to determine whether automated A-Key updating is allowed for the MSCNLR.

6. The method of claim 1, wherein the step of obtaining an alternate A-Key value includes the step of obtaining an alternate A-Key value from a Subscriber database for a subscriber associated with the handset.

7. The method of claim 1, wherein the step of obtaining an alternate A-Key value includes the step of obtaining an alternate A-Key value from an A-Key provisioning subsystem in the cellular telephone system.

8. An Authentication Center (AC) apparatus for sending an updated Authentication-Key (A-Key) value in a cellular telephone system, comprising:

a portion configured to find whether an authentication with a first A-Key has failed for a handset in the system;

a portion configured to determine whether the system is configured to allow automated A-Key updating for the Mobile Switching Center/Visitor Location Register (MSC/VLR) associated with the handset;

a portion configured to obtain an alternate A-Key value if the result of the determining portion is true;

a portion configured to generate Shared Secret Data (SSD) data using the alternate A-Key if the result of the determining portion is true; and a portion configured to perform an SSD update by sending an SSD update message to the MSC/VLR associated with the handset if the result of the determining portion is true.

9. The apparatus of claim 8, further comprising:

a portion configured to determine, when the SSD update is unsuccessful, that the A-Key in the handset is not the reason for the authentication failure; and a portion configured to determine, when the SSD update is successful, that the A-Key in the handset was the reason for the authentication failure.

10. The apparatus of claim 8, wherein the portion configured to determine that an authentication failure has occurred, includes detecting at least one authentication failure from a group including: a unique challenge failure, an SSD update failure, and an AUTHU mismatch.

11. The apparatus of claim 8, wherein the portion configured to determine whether the system is configured to allow automated A-Key updating for the MSC/VLR associated with the handset includes a portion configured to check a system-wide flag to determine whether automated A-Key updating is allowed.

12. The apparatus of claim 8, wherein the portion configured to determine whether the system is configured to allow automated A-Key updating for the MSC/VLR associated with the handset includes a portion configured to check a flag for the MSC/VLR to determine whether automated A-Key updating is allowed for the MSC/VLR.

13. The apparatus of claim 8, wherein the portion configured to obtain an alternate A-Key value includes a portion configured to obtain an alternate A-Key value from a Subscriber database for a subscriber associated with the handset.

14. The apparatus of claim 8, wherein the portion configured to obtain an alternate A-Key value includes a portion configured to obtain an alternate A-Key value from an A-Key provisioning subsystem in the cellular telephone system.

15. A computer program product comprising:

a computer usable medium having computer readable code embodied therein for updating an Authentication-Key (A-Key) value in a cellular telephone system, the computer program product including:

computer readable program code devices configured to cause a data processor to effect finding whether an authentication with a first A-Key has failed for a handset in the system;

computer readable program code devices configured to cause a data processor to effect determining whether the system is configured to allow automated A-Key updating for the Mobile Switching Center/Vistor Location Register (MSC/VLR) associated with the handset;

computer readable program code devices configured to cause a data processor to effect obtaining an alternate A-Key value if it is determined that the system is configured to allow automated A-Key updating;

computer readable program code devices configured to cause a data processor to effect generating Shared Secret Data (SSD) using the alternate AKey; and computer readable program code devices configured to cause a data processor to effect performing an SSD update by sending an SSD update message to the MSC/VLR associated with the handset if authentication with the first A-Key failed.

16. The method of claim 1, wherein computer program instructions for performing the method steps are tangibly embodied on a computer readable medium.

* * * * *

UNITED STATES PATENT AND TRADEMARK OFFICE
CERTIFICATE OF CORRECTION

PATENT NO. : 6,173,174 B1
DATED : January 9, 2001
INVENTOR(S) : Pamela J. Jacobs It is certified that error appears in the above-identified patent and that said Letters Patent is hereby corrected as shown below:

Title page,
Item [56] Add to FOREIGN PATENT DOCUMENTS

-- WO 97/01231  1/1997  WIPO ..........................H04L 9/00
    0 604 911  7/1994  European Pat Off. ............... --

IN THE SPECIFICATION AND CLAIMS:
Change all occurrences of "MSCNLR" to -- MSC/VLR --.

Claim 1,
Line 17, change "Center/Vistor" to -- Center/Visitor --.

Claim 15,
Line 18, change "Center/Vistor" to -- Center/Visitor --.

Signed and Sealed this

Sixteenth Day of October, 2001

*Attest:*

NICHOLAS P. GODICI
*Attesting Officer*    *Acting Director of the United States Patent and Trademark Office*